US006648284B2

(12) United States Patent
Caporali et al.

(10) Patent No.: US 6,648,284 B2
(45) Date of Patent: Nov. 18, 2003

(54) FLAT TUB MAIL POSITIONAL ORIENTATION JUSTIFICATION INSERT

(75) Inventors: Michael E. Caporali, Endicott, NY (US); Patrick J. Fitzgibbons, Newark Valley, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 63 days.

(21) Appl. No.: 09/945,680

(22) Filed: Sep. 5, 2001

(65) Prior Publication Data

US 2003/0042169 A1 Mar. 6, 2003

(51) Int. Cl.7 .................................................. F16M 11/24
(52) U.S. Cl. ..................... 248/188.2; 248/444; 248/694
(58) Field of Search ............................. 248/444, 188.2, 248/126, 694, 146, 148, 346.02, 918

(56) References Cited

U.S. PATENT DOCUMENTS 2,691,447 A * 10/1954 Schiffer ....................... 211/50
3,259,921 A * 7/1966 Alsobrook, Jr. .............. 33/485
3,276,735 A * 10/1966 Schneiderman .......... 248/346.5
3,595,513 A * 7/1971 Rehlaender ............ 248/346.01
3,601,438 A * 8/1971 Stuart ......................... 292/253
3,954,244 A * 5/1976 Gopstein ................. 248/349.1
4,019,730 A 4/1977 Staudinger et al.
4,238,066 A 12/1980 Brooke
4,254,872 A * 3/1981 Garrett ........................ 206/561
4,304,318 A * 12/1981 Webb ......................... 182/107
4,890,834 A * 1/1990 Ponza ......................... 473/421
4,902,079 A * 2/1990 Kaplan et al. .............. 312/245
5,035,402 A * 7/1991 Hengelmolen ............... 266/88
5,135,352 A 8/1992 Scata et al.
5,167,394 A * 12/1992 Hegarty ...................... 248/454
5,205,005 A * 4/1993 Merrill et al. ................. 5/660
5,290,025 A 3/1994 Plent et al.
5,340,099 A 8/1994 Romanenko et al.
5,340,100 A 8/1994 Romanenko
5,433,505 A * 7/1995 Coyne et al. ............ 297/284.1
5,454,538 A * 10/1995 Merideth .................... 248/237
5,464,292 A * 11/1995 Grant ......................... 400/715
5,597,218 A * 1/1997 Lechman ................. 312/233.3
5,678,800 A * 10/1997 Markussen ............. 248/346.01
5,887,406 A * 3/1999 Bond ...................... 52/749.12
6,032,669 A * 3/2000 Klein ......................... 128/845
6,041,473 A * 3/2000 Johnson ......................... 16/82
6,146,284 A * 11/2000 Russell ....................... 473/160
6,164,608 A * 12/2000 Schiel, Jr. ................ 248/188.2
6,270,912 B1 * 8/2001 Peet ........................... 428/517

* cited by examiner

*Primary Examiner*—Ramon O. Ramirez
*Assistant Examiner*—Amy J. Sterling
(74) *Attorney, Agent, or Firm*—Schwartz & Weinrieb

(57) ABSTRACT

A justification insert block is adapted to be inserted into a flat mail sorting or storage container, bin, or tub and comprises an upper planar surface which is downwardly inclined from a first corner region toward a second diagonally opposite corner region. In this manner, when the justification insert block is inserted within the flat mail sorting or storage container, bin, or tub, two edge portions of mail pieces are automatically justified against two upstanding side walls of the sorting or storage container, bin, or tub so as to maintain the mail articles or pieces in a predetermined order within a stack of flat mail articles or pieces.

14 Claims, 3 Drawing Sheets

FLAT TUB MAIL POSITIONAL ORIENTATION JUSTIFICATION INSERT

FIELD OF THE INVENTION

The present invention relates generally to flat mail arranging or orientation devices or implements, and more particularly to a new and improved flat mail arranging, justifying, or orientation implement or device which is adapted to be inserted within existing flat mail sorting or storage containers, bins, or tubs such that when flat mail pieces or units are deposited into the flat mail sorting or storage containers, bins, or tubs, stacking of the flat mail pieces or units within the sorting or storage containers, bins, or tubs is facilitated, and the stack integrity is able to be preserved whereby the order or arrangement of the flat mail pieces or units is maintained which is indispensable in connection with the automatic processing and the sequenced delivery of mail to recipients.

BACKGROUND OF THE INVENTION

Flat mail, which may comprise, for example, magazines, newspapers, advertisements, catalogs, and the like, are conventionally sorted into containers, bins, or tubs as disclosed at 10 within FIG. 1 wherein it is seen that a conventional container, bin, or tub comprises a five-sided structure 12 having a bottom 14, a pair of slightly upwardly sloped oppositely disposed side walls 16, a pair of slightly upwardly sloped oppositely disposed end walls 18, and an open top 20. Flat mail may vary in size from approximately five inches long by four inches wide (5"×4") to approximately fifteen inches long by twelve inches wide (15"×12"), and the thickness of the flat mail pieces or units may likewise vary from nine-thousandths of an inch (0.009") to one and one-quarter inches (1.25").

This variability or diversity in the dimensions of existing flat mail pieces or units makes it substantially difficult not only to stack the mail pieces or units within existing postal or commercial delivery service containers, bins, or tubs, but in addition, it is additionally difficult to maintain the proper order and orientation of the mail units or pieces which is indispensable in connection with automatic processing and sequenced delivery of mail to recipients. As the flat mail pieces or units are deposited into and stacked within existing sorting or storage containers, bins, or tubs, the variable-sized accumulated mail pieces or units tend to slide around within the containers, bins, or tubs and therefore do not stack neatly. In addition, disrupting forces may act upon the stacked pieces or units of mail while the containers or tubs are being conveyed from one location to another by suitable conveyor systems or delivery carts. As a result, some of the mail pieces or units may slide off the accumulated stack, they may become oriented upon one of their edges, and accordingly, may be disposed out of their original order which is problematic in connection with advanced technology mail processing and sequenced mail delivery systems.

The aforenoted difficulties and problems attendant the handling of flat mail pieces or units obviously occur worldwide, that is, all national postal mail or commercial delivery service agencies and companies experience such operational problems or difficulties. Accordingly, some foreign or international postal services or commercial delivery organizations have designed new flat mail containers or tubs in an effort to resolve the aforenoted problems impacting the stack integrity, orientation, and order of the various mail pieces or units, however, such newly designed containers or tubs are heavier, they are more costly, and their implementation would effectively require the elimination of all existing containers or tubs. Within the United States Postal Service alone, literally millions of such containers or tubs are in existence. Accordingly, their replacement would require new expenditures comprising millions of dollars. In addition, the increased shipping weight of such containers or tubs would also adversely impact postal service costs. As an alternative to designing new mail containers or tubs, attempts have been made to alter the processing apparatus or equipment in an attempt to resolve the aforenoted stacking, orientation, and mail order problems. For example, as disclosed within U.S. Pat. No. 5,290,025 which was issued to Plent et al. on Mar. 1, 1994, flat mail pieces or units are discharged from sorting equipment in a vertical mode and are deposited into a bin or tub which is disposed in an inclined state. In a similar manner, as disclosed within U.S. Pat. No. 5,135,352 which issued to Scata et al. on Aug. 4, 1992, flat mail pieces or units are deposited into a container which is disposed at an inclined angle by means of its mounting bracket. Lastly, as disclosed within U.S. Pat. Nos. 5,340,100 and 5,340,099, both of which issued on Aug. 23, 1994 to Romanenko and Romanenko et al., respectively, orientation chute adjuncts have been utilized in connection with mail piece sorting machines, however, such chutes do not address the stacking, orientation, and order problems noted heretofore in connection with the mail pieces or units when they are actually disposed within the sorting or storage containers, bins, or tubs.

A need therefore exists in the art for a new and improved flat mail arranging, justifying, or orientation implement or device which is to be adapted to be inserted within existing flat mail sorting containers, bins, or tubs such that when flat mail pieces or units are deposited into and stacked within the flat mail sorting containers, bins, or tubs, stacking of the flat mail pieces or units is facilitated, the stack integrity is able to be preserved whereby the order or arrangement of the flat mail pieces or units is maintained which is indispensable in connection with the automatic processing and sequenced delivery of mail to recipients, wherein the implement or insert is relatively inexpensive to manufacture and is light in weight, and wherein the implement or insert is able to be readily accommodated within existing postal service or commercial entity sorting and storage bins, containers, or tubs whereby such existing containers, bins, or tubs need not be replaced.

OBJECTS OF THE INVENTION

Accordingly, it is an object of the present invention to provide a new and improved flat mail arranging, justifying, or orientation implement or device for use as a separate or separable insert for disposition within flat mail sorting or storage containers, bins, or tubs.

Another object of the present invention is to provide a new and improved flat mail arranging, justifying, or orientation implement or device for use as a separate or separable insert for disposition within flat mail sorting or storage containers, bins, or tubs which effectively overcomes various operational disadvantages and drawbacks characteristic of PRIOR ART systems and implements.

An additional object of the present invention is to provide a new and improved flat mail arranging, justifying or orientation implement or device for use as a separate or separable insert for disposition within flat mail sorting or storage containers, bins, or tubs in order to facilitate the stacking of flat mail pieces or units within a sorting or storage bin as well as to maintain or preserve the stacking, orientation, and order of the flat mail pieces or units within the storage or sorting containers, bins, or tubs which is indispensable in connection with the automatic processing and sequenced delivery of mail to recipients.

A further object of the present invention is to provide a new and improved flat mail arranging, justifying, or orientation implement or device for use as a separate or separable insert for disposition within existing flat mail sorting or storage containers, bins, or tubs in order to facilitate the stacking of flat mail pieces or units within an existing sorting or storage bin as well as to maintain or preserve the stacking, orientation, and order of the flat mail pieces or units within the storage or sorting containers, bins, or tubs, which is indispensable in connection with the automatic processing and sequenced delivery of mail to recipients, such that existing sorting or storage containers, bins, or tubs need not be discarded and replaced.

A last object of the present invention is to provide a new and improved flat mail arranging, justifying, or orientation implement or device for use as a separate or separable insert for disposition within existing flat mail sorting or storage containers, bins, or tubs in order to facilitate the stacking of flat mail pieces or units within an existing sorting or storage bin as well as to maintain or preserve the stacking, orientation, and order of the flat mail pieces or units within the storage or sorting containers, bins, or tubs, which is indispensable in connection with the automatic processing and sequenced delivery of mail to recipients, such that complex and costly stacking and orientation adjuncts need not be employed in conjunction with existing mail conveying, sorting, and distribution apparatus or systems.

SUMMARY OF THE INVENTION

The foregoing and other objectives are achieved in accordance with the teachings and principles of the present invention through the provision of a new and improved flat mail arranging, justifying or orientation implement or device, for use as a separate or separable insert for disposition within existing flat mail sorting or storage containers, bins, or tubs, which comprises a substantially rectangularly configured insert support block wherein the upper surface thereof is inclined downwardly from a first corner to a diagonally opposite second corner. In this manner, when the insert support block is inserted into or deposited within a particular flat mail sorting or storage container, bin, or tub, the insert support block will facilitate the stacking of flat mail pieces or units within the existing sorting or storage container, bin, or tub in such a manner that each incoming mail piece or unit will tend to slide downwardly along the inclined surface of the support block and orient itself toward the diagonally lower corner region of the support block and against the two side walls of the container, bin, or tub which are located upon opposite sides of such diagonally lower corner region of the support block. In addition, since the aforenoted structure of such an insert support block causes all subsequent mail pieces or units to likewise be similarly positioned and oriented with respect to the lower corner region of the support block, and with respect to the two side walls of the container, bin, or tub which are located upon opposite sides of such diagonally lower corner region of the support block, a stack of the flat mail pieces or units is automatically formed. More particularly, since all of the mail pieces or units will in effect be gravitationally biased toward the aforenoted corner region of the container, bin, or tub as defined by means of the two side walls disposed upon opposite sides of the lower corner region of the support block, all mail pieces will have two sides thereof justified or disposed in contact with the two sides of the container, bin, or tub forming the corner within which the lowest point of the inclined insert is disposed.

Consequently, the mail pieces or units will form a stack of mail which will have two vertical surfaces thereof comprised of edge portions of each mail piece which are substantially aligned or justified with respect to each other, and since the stack of mail will be inclined downwardly toward a corner region of the sorting or storage container, bin, or tub, the integrity of the stack of mail will be preserved and maintained whereby, in turn, the stacking, orientation, and order of the flat mail pieces or units, disposed within the stack of mail disposed within the storage or sorting container, bin, or tub, is therefore maintained or preserved which is indispensable in connection with the automatic processing and sequenced delivery of mail to recipients. As a result of employing such insert support blocks within existing sorting or storage containers, bins, or tubs, it is also noted that existing sorting or storage containers, bins, or tubs need not be replaced and discarded whereby the new and improved insert support blocks constructed in accordance with the principles and teachings of the present invention comprise relatively inexpensive means for rectifying the problems characteristic of existing or conventional sorting or storage containers, bins, or tubs.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
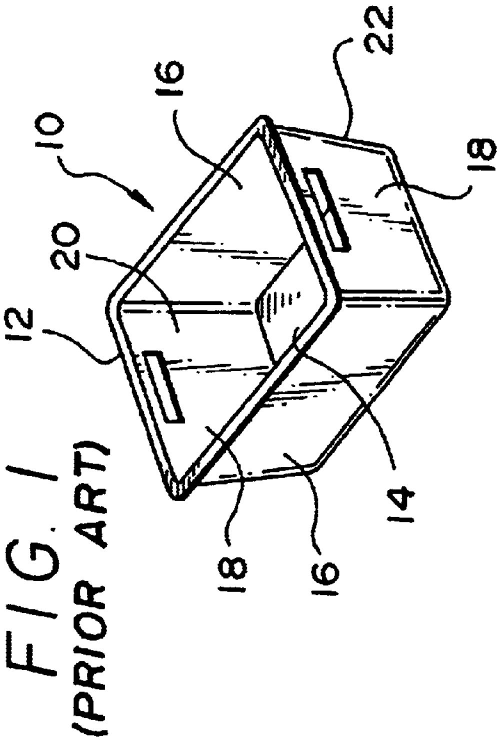
FIG. 1 (PRIOR ART)
FIG. 1 is a perspective view of a conventional PRIOR ART sorting or storage container, bin, or tub within which flat mail pieces or units are to be conventionally deposited for stacking.
Figure 8:
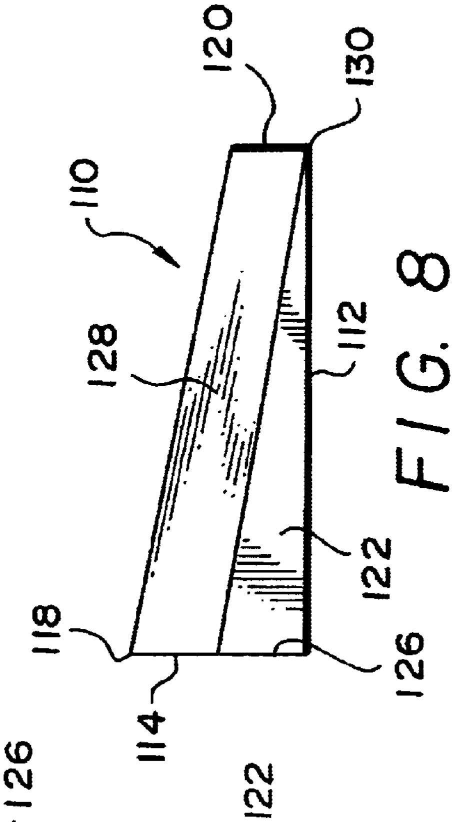
FIG. 8 is an end elevational view of the new and improved insert support block as shown in FIG. 6.
Figure 6:
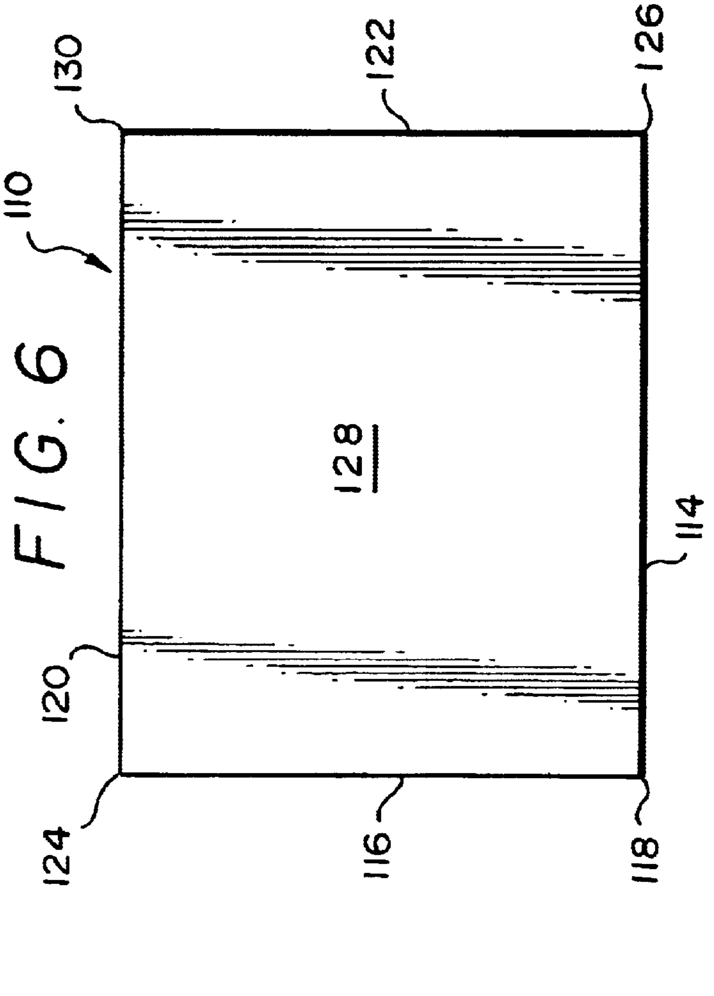
FIG. 6 is a top plan view of the new and improved insert support block as disclosed within FIG. 2.
Figure 7:
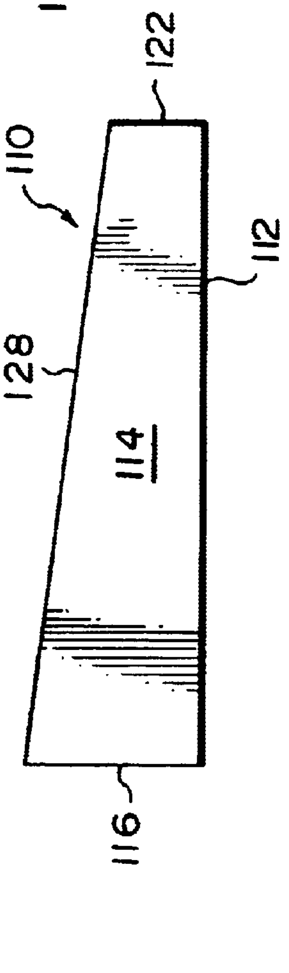
FIG. 7 is a side elevational view of the new and improved insert support block as shown in FIG. 6.
Figure 2:
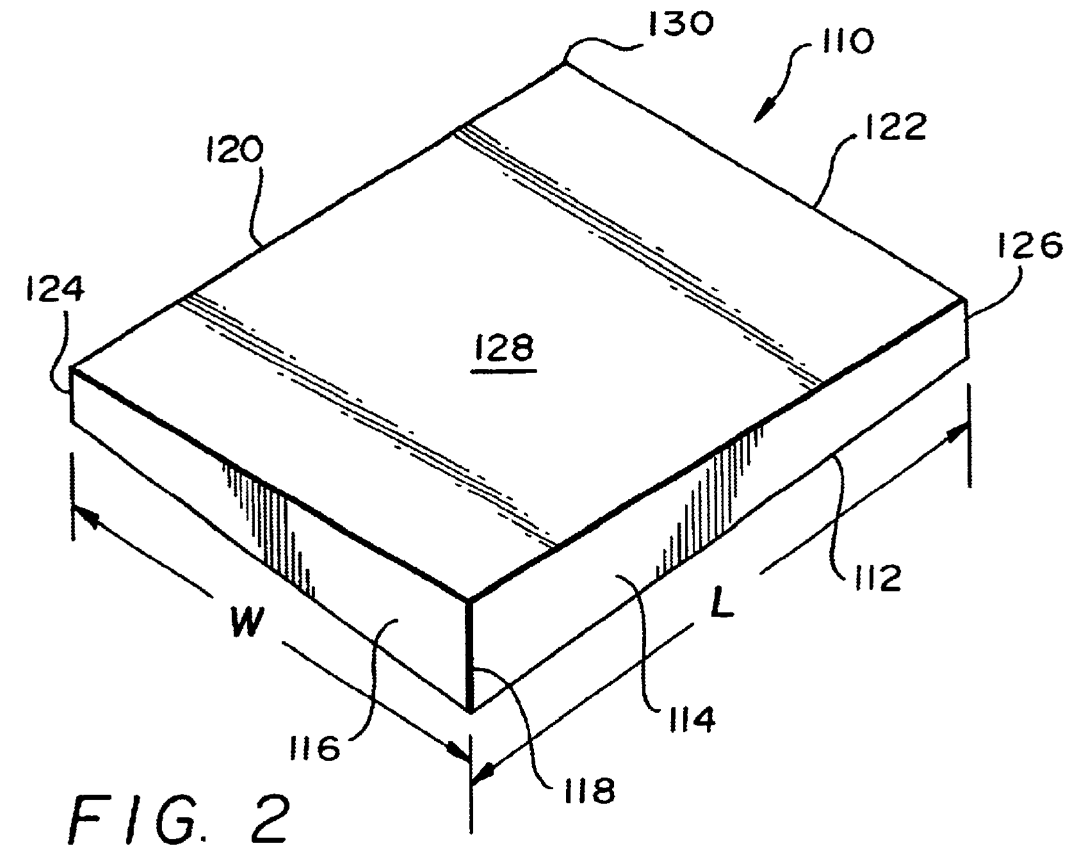
FIG. 2 is a top perspective view of a new and improved insert support block, as viewed from the highest corner region thereof, which has been constructed in accordance with the principles and teachings of the present invention, wherein the drawing shows the cooperative parts thereof, and wherein the insert support block is adapted to be inserted into and used within a conventional PRIOR ART flat mail sorting or storage container, bin, or tub such as that shown in FIG. 1.
Figure 3:
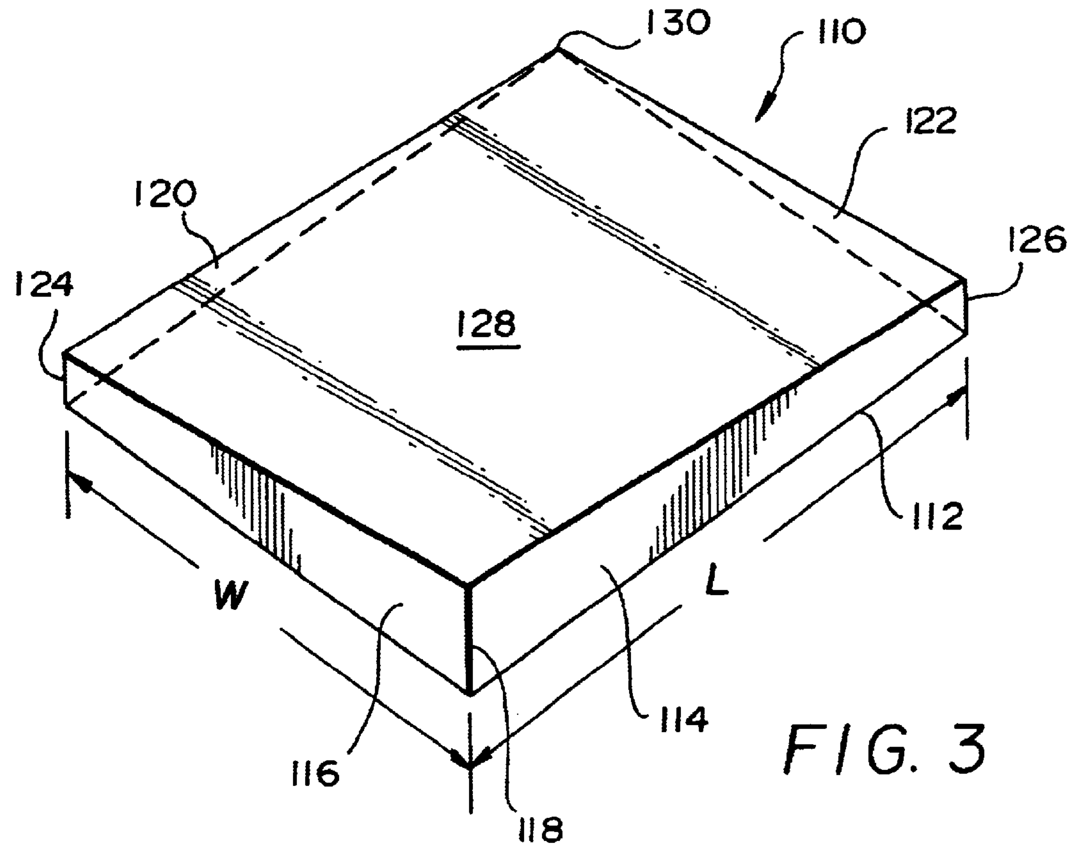
FIG. 3 is view similar to that shown in FIG. 2 showing, however, the opposite side, end, and bottom walls of the insert support block in dotted lines.
Figure 4:
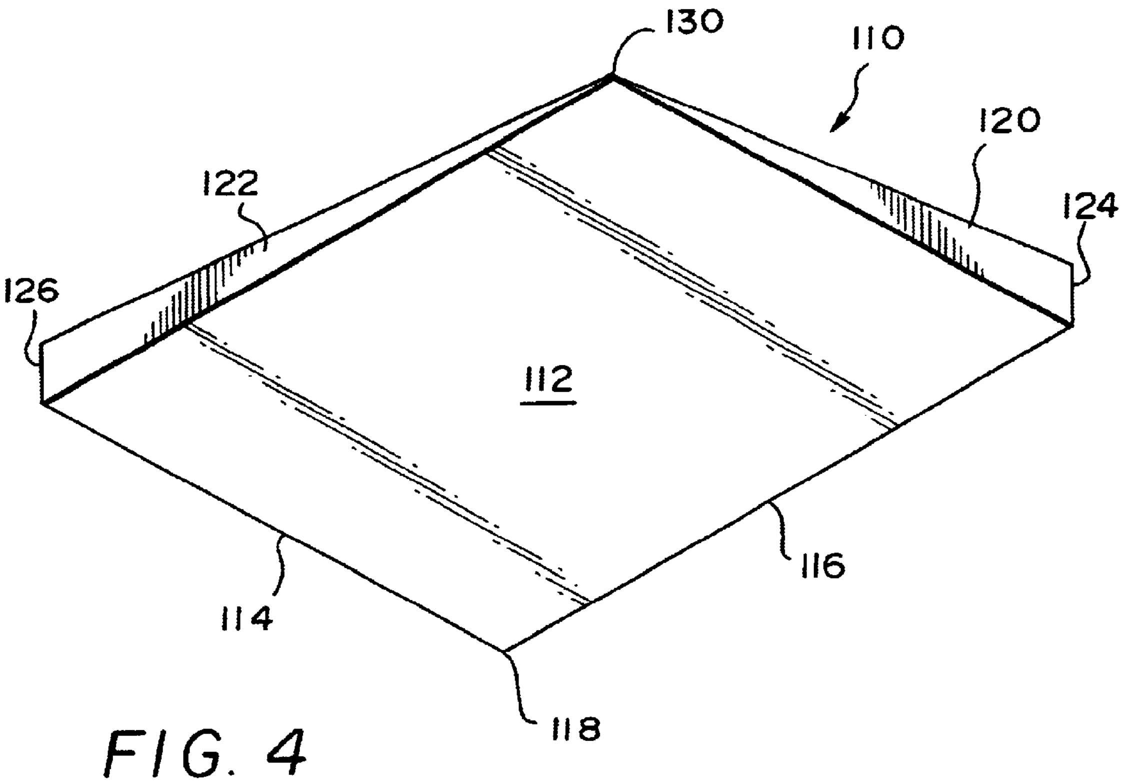
FIG. 4 is a bottom perspective view of the new and improved insert support block as shown in FIGS. 2 and 3 showing, however, the insert support block from the underside thereof and from the perspective or vantage point of the lowest corner region thereof.
Figure 5:
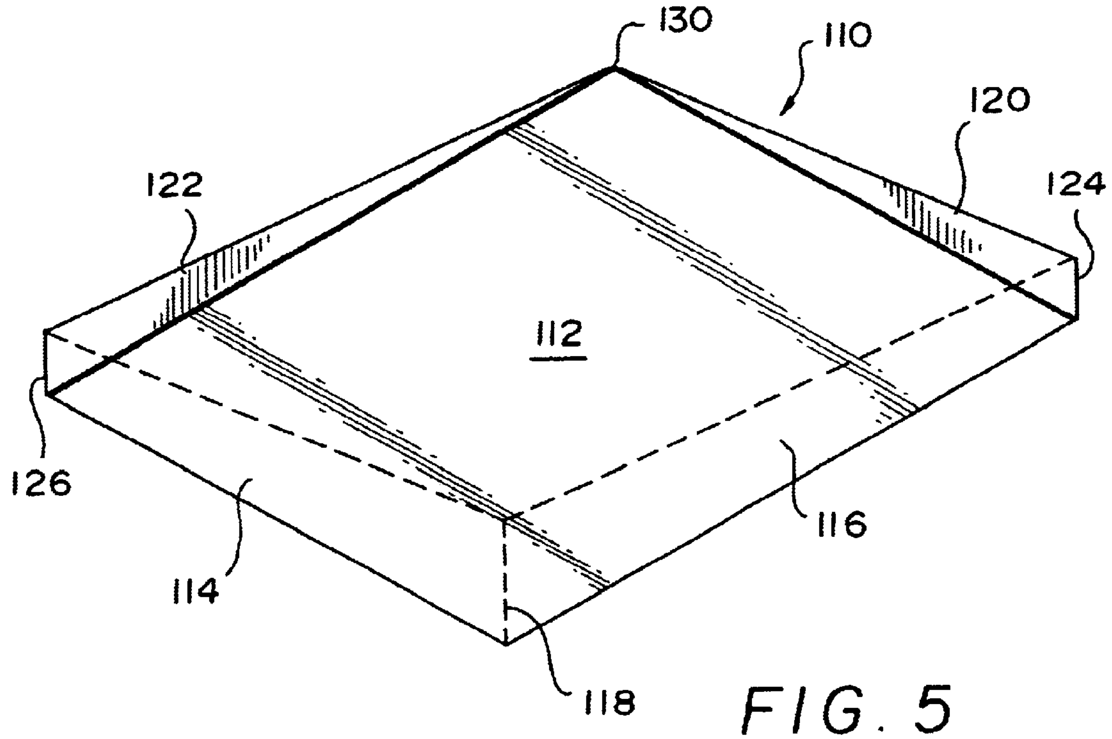
FIG. 5 is a view similar to that of FIG. 4 showing, however, the opposite side, end, and top walls in dotted lines.

Referring now to the drawings, and more particularly to FIGS. 2–8 thereof, a new and improved insert support or orientation block, which is adapted to be inserted as a separate or separable entity into and within a conventional PRIOR ART sorting or storage container, bin, or tub, such as that disclosed at 10 in FIG. 1, is disclosed and is generally indicated by the reference character 110. The insert support or orientation block 110 is seen to have an overall configuration which is substantially that of a rectangular parallelepiped and accordingly comprises a horizontally disposed bottom surface 112 which has a length dimension L which is approximately fifteen inches (15.00") long and a width dimension W which is approximately twelve inches (12.00") wide. In addition, the support or orientation block 110 is seen to further comprise a first side wall 114 and a first end wall 116 which meet or intersect each other at a first corner 118 wherein the vertical extent or height dimension of the support or orientation block 110 as considered along the first corner 118 is approximately four inches (4.00").

In a similar manner, the support, justification, or orientation block 110 comprises a second side wall 120 disposed opposite first side wall 114, and a second end wall 122 disposed opposite first end wall 116. First end wall 116 and second side wall 120 meet or intersect each other at a second corner 124, while first side wall 114 and second end wall 122 meet or intersect each other at a third corner 126. Lastly, the support or orientation block 110 comprises an upper or top surface 128, and it is to be particularly appreciated that the upper or top surface 128 comprises or defines a plane which is tilted downwardly from the upper extreme end of first corner 118 to the diagonally opposite fourth corner 130 wherein the height dimension of the support or orientation block 110 at the fourth corner 130 is approximately zero inches (0.00"). Accordingly, the height dimensions of the support or orientation block 110 at the second and third corners 124,126, respectively, will be approximately two inches (2.00").

It can thus be further appreciated that when the insert support or orientation block 110 is inserted into and disposed within, for example, a conventional PRIOR ART flat mail sorting or storage container, bin, or tub, such as, for example, the conventional PRIOR ART flat mail sorting or storage container, bin, or tub 10 as disclosed within FIG. 1, the fourth corner 130 of the insert support or orientation block 110 will be disposed within one of the corner regions of the conventional PRIOR ART flat mail sorting or storage container, bin, or tub 10, such as, for example, corner region 22, whereby the inclined or tilted upper or top planar surface 128 of the insert support or orientation block 110 will slope downwardly toward the corner region 22 of the conventional PRIOR ART flat mail sorting or storage container, bin, or tub 10. In addition, second side wall 120 of the insert support or orientation block 110 will be disposed adjacent to that side wall 16 of conventional PRIOR ART flat mail sorting or storage container, bin, or tub 10 which is disposed upon one side of corner region 22, while second end wall 122 of the insert support or orientation block 110 will be disposed adjacent to that end wall 18 of conventional PRIOR ART flat mail sorting or storage container, bin, or tub 10 which is disposed upon the other side of corner region 22.

Therefore, it can be further appreciated that when flat mail articles, pieces, or units are inserted into and disposed within the conventional PRIOR ART flat mail sorting or storage container, bin, or tub 10, the flat mail pieces, articles, or units will be deposited onto the upper planar surface 128 of the insert support or orientation block 110, and will subsequently be gravitationally biased so as to tend to slide downwardly upon the upper planar surface 128 of the insert support or orientation block 110 toward the lowest fourth corner region 130. As a result of such sliding movement of each article, piece or unit of flat mail upon the upper planar surface 128 of the insert support or orientation block 110, each article, piece, or unit of flat mail will tend to subsequently orient, justify, or align itself with respect to the end walls 122 and 18 of the insert support or orientation block 110 and the conventional PRIOR ART flat mail sorting or storage container, bin, or tub 10, respectively, as well as with respect to the side walls 120 and 16 of the insert support or orientation block 110 and the conventional PRIOR ART flat mail sorting or storage container, bin, or tub 10, respectively. Accordingly, edge portions of each article, piece, or unit of flat mail, which are disposed upon or define opposite sides or ends of a particular corner region of each unit, article, or piece of flat mail, will tend to be oriented, justified, or aligned against or with respect to the side and end walls 16,18 of the conventional PRIOR ART flat mail sorting or storage container, bin, or tub 10.

Therefore, it can be further appreciated all flat mail articles, pieces, or units inserted into and disposed within the conventional PRIOR ART flat mail sorting or storage container, bin, or tub 10 will have two edge portions thereof oriented, aligned, and justified with respect to each other and with respect to the aforenoted side and end walls 16,18 of the conventional PRIOR ART flat mail sorting or storage container, bin, or tub 10 so that all of the units, articles, or pieces of flat mail will be disposed within a neatly arranged pile or stack within the conventional PRIOR ART flat mail sorting or storage container, bin, or tub 10 with the aforenoted edge portions of the numerous articles, pieces, or units of flat mail together defining two uniform, substantially vertical sides of the stack or pile of flat mail. It can therefore be further appreciated that as a result of the provision, insertion, and disposition of the new and improved insert support or orientation block 110 into and within the conventional PRIOR ART flat mail sorting or storage container, bin, or tub 10, all articles, pieces, or units of flat mail will in fact be properly disposed within the stack or pile of flat mail, that all units, pieces, or articles of flat mail will in fact be disposed within the stack or pile of flat mail in their proper sequential or serial order, and that the integrity of the stack or pile of flat mail articles, pieces, or units will in fact be preserved whereby the order or arrangement of the flat mail articles, pieces, or units, which is indispensable in connection with the automatic processing and sequenced delivery of mail to recipient, will in fact be able to be maintained.

It is to be lastly noted that in order to facilitate the sliding movement of each one of the articles, pieces, or units of flat mail along the upper planar surface 128 of the new and improved insert support or orientation block 110, the upper planar surface 128 of the new and improved insert support or orientation block 110 may be coated with a suitable anti-friction or anti-stick composition, such as, for example, polytetrafluoroethylene (TEFLON®), and/or in addition, in order to dissipate any static electricity problems or tendencies, the upper planar surface 128 of the new and improved insert support or orientation block 110 may likewise be coated with a suitable anti-static composition. Still yet further, it is noted that the justification insert block can be fabricated from any one of a plurality of desirable materials, such as, for example, plastic, metal, corrugated cardboard, or the like.

Thus, it may be seen that in accordance with the principles and teachings of the present invention, there has been developed a new and improved insert support or orientation block which comprises a separate and separable entity for insertion and disposition within a conventional PRIOR ART sorting or storage container, bin, or tub such that flat mail articles, pieces, or units being inserted into and deposited within the conventional PRIOR ART sorting or storage container, bin, or tub can each be pre-disposed toward a justified, oriented, or aligned position with respect to a corner region of the conventional PRIOR ART sorting or storage container, bin, or tub such that all of the articles, pieces, or units of flat mail will have two edge portions thereof properly justified, oriented, and aligned with respect to two side and end walls of the conventional PRIOR ART sorting or storage container, bin, or tub whereby the flat mail articles, pieces, or units will all be arranged within a neatly formed and uniformly arranged stack or pile. In this manner, even if the conventional PRIOR ART sorting or storage container, bin, or tub is subjected to forces attendant, for example, the conveyance of the same along a suitable transport conveyor, or as a result of being transported by a suitable cart or the like, the integrity of the stack or pile of the flat mail articles, pieces, or units will be preserved so as to in turn maintain the sequential or serial order of the various articles, pieces, or units of flat mail comprising the stack or pile of flat mail articles, pieces, or units, which is indispensable in connection with the high-speed automatic processing and address sequence delivery of mail to recipients.

Lastly, it is noted that in light of the foregoing disclosure, many variations and modifications of the present invention are possible. It is therefore to be understood that within the scope of the appended claims, the present invention may be practiced otherwise than as specifically described herein.

What is claimed as new and desired to be protected by Letters Patent of the United States of America, is:

1. A justification insert block adapted to be disposed within an article storage tub having a bottom surface and a plurality of upstanding side walls connected to the bottom surface, comprising:

bottom surface means for disposition upon a bottom surface of an article storage tub;

a plurality of side walls extending upwardly from said bottom surface means; and single, substantially planar top surface means, integrally connected to said plurality of side walls and inclined downwardly toward said bottom surface means from a first corner region disposed at a first elevational level, toward a second corner region disposed at a second elevational level which is less than said first elevational level, wherein other corner regions of said single, substantially planar top surface means are disposed at elevational levels interposed between said first and second elevational levels, for aligning at least one edge portion of each one of a plurality of articles against at least one upstanding side wall of the article storage tub when said justification insert block is disposed within the article storage tub and when the plurality of articles are placed upon said single, substantially planar top surface means of said justification insert block.

2. The justification insert block as set forth in claim 1, wherein:

said justification insert block has a configuration which is substantially that of a rectangular parallele-piped.

3. The justification insert block as set forth in claim 2, wherein:

said top surface means of said justification insert block is inclined downwardly from said first corner region of said justification insert block toward said second corner region of said justification insert block which is located diagonally opposite said first corner region of said justification insert block.

4. The justification insert block as set forth in claim 3, wherein:

said first corner region of said justification insert block has a first predetermined height dimension, and said second corner region of said justification insert block has a second predetermined height dimension which is less than said first predetermined height dimension of said first corner region of said justification insert block.

5. The justification insert block as set forth in claim 2, wherein:

said top surface means of said justification insert block is inclined downwardly from said first corner region of said justification insert block toward said second corner region of said justification insert block which is located diagonally opposite said first corner region of said justification insert block, whereby when said justification insert block is disposed within an article storage tub, articles placed upon said top surface means of said justification insert block will have two edge portions thereof justified against two upstanding side walls of the article storage tub disposed upon opposite sides of said second corner region of said justification insert block.

6. The justification insert block as set forth in claim 3, wherein:

said downwardly inclined top surface means of said justification insert block has an anti-stick coating applied thereto.

7. The justification insert block as set forth in claim 5, wherein:

said downwardly inclined top surface means of said justification insert block has an anti-static coating applied thereto.

8. The justification insert block as set forth in claim 2, wherein:

said top surface means of said justification insert block comprises a rectangular planar surface member which is inclined downwardly from said first elevated corner region of said justification insert block so as to terminate at said second lower corner region of said justification insert block which is disposed diagonally opposite said first corner region of said justification insert block.

9. The justification insert block as set forth in claim 2, wherein:

said first elevated corner region of said justification insert block has a height dimension of approximately four inches (4.00"), and said second lower corner region of sasid justification insert block has a height dimension which may be as little as zero inches (0.00").

10. The justification insert block as set forth in claim 9, wherein:

the two remaining corner regions of said justification insert block have height dimensions which are between zero inches (0.00") and four inches (4.00").

11. The justification insert block as set forth in claim 10, wherein:

said two remaining corner regions of said justification insert block have height dimensions of approximately two inches (2.00").

12. The justification insert block as set forth in claim 1, wherein:

said justification insert block is fabricated from a material selected from the group comprising metal, plastic, and corrugated cardboard.

13. The justification insert block as set forth in claim 1, wherein:

said downwardly inclined top surface means of said justification insert block has an anti-stick coating applied thereto.

14. The justification insert block as set forth in claim 1, wherein:

said downwardly inclined top surface means of said justification insert block has an anti-static coating applied thereto.

* * * * *